United States Patent Office 3,480,777
Patented Nov. 25, 1969

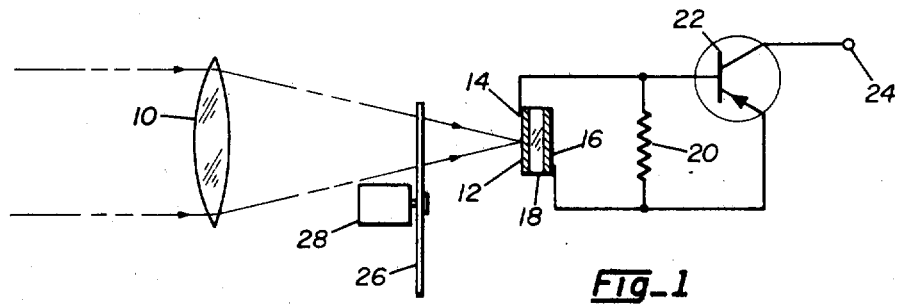
Fig_1
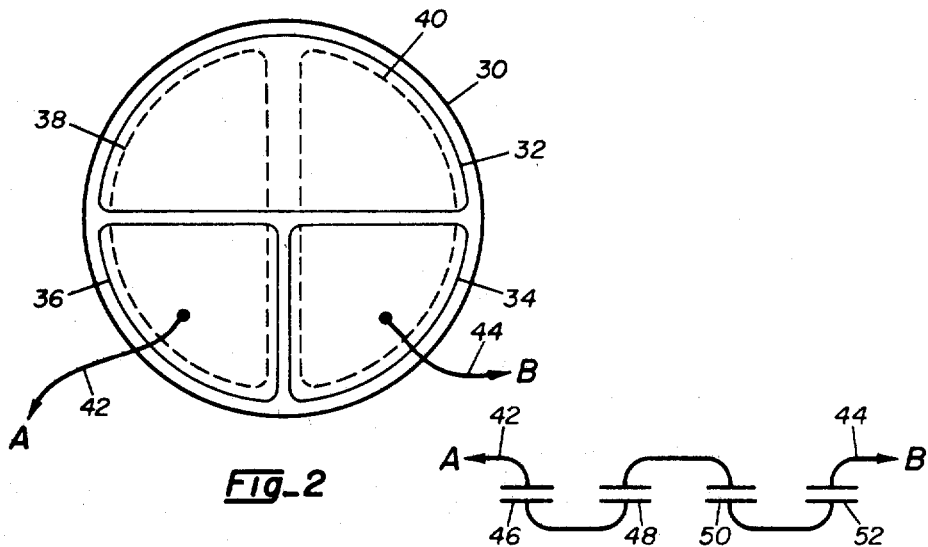
Fig_2
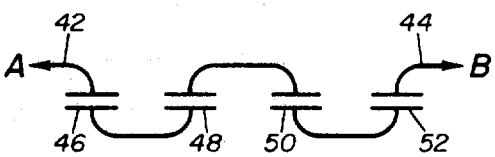
Fig_3
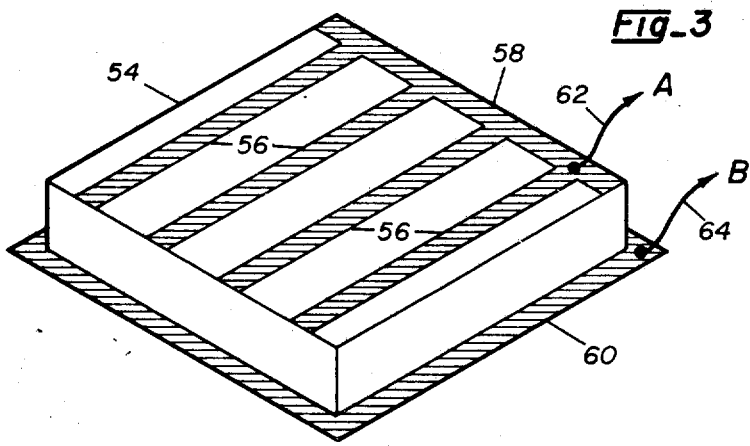
Fig_4
INVENTOR.
ROBERT W. ASTHEIMER
BY Joseph Levinson

3,480,777
PYROELECTRIC RADIATION DETECTION SYSTEM WITH EXTENDED FREQUENCY RANGE AND REDUCED CAPACITANCE
Robert W. Astheimer, Westport, Conn., assignor to Barnes Engineering Company, Stamford, Conn., a corporation of Delaware
Continuation of application Ser. No. 560,193, June 24, 1966. This application Feb. 28, 1969, Ser. No. 804,382
Int. Cl. G01t 1/16
U.S. Cl. 250—83.3    3 Claims

ABSTRACT OF THE DISCLOSURE

A pyroelectric radiation detection system utilizes a pyroelectric radiation detector in which the crystals thereof exhibit temperature-dependent change effects which are read out by a high impedance voltage device. The crystalline pyroelectric detector has electrodes on which a charge is built up proportional to the incident radiation. These electrodes are divided and interconnected in such a manner to reduce the total capacitance and develop a greater voltage for a given charge to extend the frequency range of the detection system.

---

This case is a continuation of Ser. No. 560,193, now abandoned.

This invention relates to a radiation detection system and more particularly to such a system which utilizes a pyroelectric radiation detector of a type which produces a charge proportional to the incident radiation.

A type of thermal detector may be based on the pyroelectric effect. If a pyroelectric material at a temperature below its Curie point is subjected to an electric field, the material becomes spontaneously polarized. This polarization remains after the electric field is removed. It can be removed either by raising the temperature above the Curie point or subjecting the material to a strong reverse electric field at lower temperatures. By placing electrodes on the material, a type of detector is formed which is essentially a small capacitor on which a charge, and consequently a voltage, appear when its temperature is changed. The pyroelectric detector has several advantages over other thermal type detectors which stem from the fact that it is a pure capacitance and as such generates no internal noise. This type of detector is very sensitive to small temperature changes. However, the detectivity of the pyroelectric detector is limited by the short circuit noise of the preamplifier to which it is coupled. The Johnson noise of the input resistance of the amplifier is attenuated as the frequency of the input signal increases, but after the Johnson noise falls below the short circuit noise of the preamplifier, no further noise attenuation results with increasing frequency. The effect depends upon the size of the detector. Detectors about 1 cm. square become amplifier noise limited at frequencies above 30 c.p.s. and the detectivity then degrades.

It is an object of this invention to provide a radiation detection system utilizing a pyroelectric radiation detector with an extended operating frequency range.

A further object of this invention is to provide a radiation detection system utilizing a pyroelectric detector with divided and interconnected electrodes whose total capacitance is less than a pyroelectric detector of comparable size with undivided electrodes to thereby provide a system which develops a greater voltage for a given charge placed on the detector by incoming radiation.

These and other objects, together with a better understanding of this invention, will be more readily apparent from the following description taken in connection with the accompanying drawings, in which:

FIG. 1 is a schematic diagram of the radiation detection system embodied in this invention, FIG. 2 is a top view of a type of pyroelectric detector which may be used in the system shown in FIG. 1, FIG. 3 shows an equivalent electrical circuit for the configuration of the detector shown in FIG. 2, and FIG. 4 is an isometric view of another type of pyroelectric detector which may be utilized in the circuit of FIG. 1.

The radiation detection system of the present invention utilizes for its detection principle the phenomenon of pyroelectricity, which is a property possessed by a particular class of pyroelectric crystalline material. Crystals in this class can be electrically polarized, and such crystals exhibit temperature-dependent charge effects which can be read out by high impedance voltage-sensitive devices. A number of materials are known to exhibit pyroelectric effects. Although triglycene sulphate (TGS) is preferred for use in the pyroelectric detector of this invention, materials such as barium titanate, Rochelle salt, lithium sulphate, or others which exhibit the pyroelectric effect, may also be utilized. The particular type of pyroelectric material which is utilized will be determined by the environment and operating requirements of the particular application in which the invention is employed.

Referring now to FIG. 1, an optical means 10 is provided for collecting and focusing incoming infrared radiation which is to be measured on a pyroelectric detector 12. The optical means is shown as a lens 10; however, it will be appreciated that any form of optical means may be utilized, whether it be dioptric or catoptric, as long as it performs the function of applying the desired radiation which is to be measured on the pyroelectric detector. The pyroelectric detector 12 includes a pyroelectric crystal 18 having electrodes 14 and 16 which are connected across the input of an amplifier 22. The amplifier 22 is preferably a high impedance voltage-sensitive device which is capable of responding quickly to small changes in voltage across the pyroelectric detector 12. An example of a suitable type amplifier is a Union Carbide type UC–240 FET. The particular amplifier used, however, will depend on the application and the operating requirements of the system. The internal resistance of the amplifier is represented by a resistor 20 which is shown connected across the input terminals of the amplifier 22. Interposed between the optical means 10 and the pyroelectric detector 12 is a conventional chopper 26 which is driven by a motor 28. The chopper 26 functions to modulate radiation being applied to the detector 12 by alternately blocking and then passing radiation to the detector.

It was originally believed that pyroelectric detectors would provide a stable signal-to-noise ratio, since the signal and noise would decrease at the same rate as the area of the detector was increased. However, it was found that the noise did not decrease as much as expected, due to the short circuit noise of the amplifier, which is reached at a low frequency. At lower frequencies, it was found that the pyroelectric detector 12 became limited by internal amplifier noise, with the result of decreasing detectivity.

One means of dealing with this problem is to divide the detector into a number of capacitance elements which are thermally in parallel but electrically in series, such as shown in FIG. 2. FIG. 2 shows a convenient arrangement for a circular pyroelectric detector, but it will be appreciated that different geometric configurations may be utilized in accordance with this invention. A pyroelectric crystalline material 30 is provided with upper electrodes 32, 34, and 36, and bottom electrodes 38 and 40. The electrodes are formed in sectors, with those on the bottom displaced with respect to those on the top by half the angle of one electrode sector. Output leads 42 and 44 are connected to a pair of half-width elements 34 and 36 of the upper electrodes. FIG. 3 shows the equivalent circuit formed by the aforesaid configuration of electrodes on the pyroelectric material 30. A group of series-connected capacitors 46, 48, 50, and 52 result from the combination of electrodes 36–38, 32–38, 32–40, and 34–40, respectively, as shown in FIG. 2.

With the electrode configuration as shown in FIG. 2, a direct current polarizing voltage is applied to the output leads 42 and 44, and all of the capacitive elements 46, 48, 50 and 52 will be polarized at the same time. Alternate elements will be poled with opposite polarities, which is the proper condition for signal voltages to add in series. With radiation applied to the pyroelectric detector as shown in FIG. 2, the same voltage will be developed across each capacitive element 46, 48, 50 and 52, as would be developed if the detector were made as one single capacitor, since the latter could be considered a group of elemental capacitors in parallel. However, with the configuration shown, the capacitive elements are electrically connected in series, so that if there are $n$ elements, the output voltage, and therefore the responsivity of the detector will be increased by a factor of $n$.

The capacitance of each element is $1/n$ that of a single element detector. When connected in series, the output capacitance is reduced by another factor of $n$, and therefore the capacitance of the array is reduced by the square of the number of elements which make up the capacitor. The noise contributed by the input resistance will therefore increase as the square of the number of elements.

It will be seen that the effect of dividing the pyroelectric detector into a plurality of capacitive elements in series is to increase the signal directly, and the resistance noise as the square of the number of elements. However, since the limiting factor is the short-circuit noise of the amplifier 22, the increase in signal level is pure gain until the point is reached where the resistance noise (Johnson noise) of the amplifier becomes dominant.

It may be desirable to increase the responsivity with sacrificed capacitance, as the first power rather than as the square of the responsivity increase. The arrangement shown in FIG. 2 is not suitable for this purpose. However, other configurations, such as that shown in FIG. 4, may be utilized. FIG. 4 shows an array of line plate capacitors electrically connected in parallel. A pyroelectric crystal 54 has an upper electrode comprised of a series of narrow conducting strips 56, which are relatively widely spaced and electrically interconnected by strip 58 at one edge thereof. The bottom electrode is comprised of a continuous surface electrode 60. Output leads 62 and 64 are connected to the lower and upper electrodes of the detector. When the pyroelectric detector of FIG. 4 is polarized by the application of a direct current potential to the output leads 62 and 64, the detector thus functions in the pyroelectric mode and the charge developed will be deposited on the conductive strips 56. The dielectric material of the crystal 54 near the upper surface between the strips 56 contributes little charge, but the capacitance of the detector will be reduced considerably more than the charge, and a substantial increase in responsivity results.

It will be appreciated that the optimum number of elements into which a pyroelectric detector is to be divided will depend on the amplifier used in combination therewith. The present invention contemplates reducing the amount of capacitance which is applied to the amplifier to overcome the short circuit noise problem of the amplifier and extend the frequency range over which the system can operate. The reduction in capacitance is related to a detector of comparable size, and not to the use of smaller or larger detectors.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What I claim as new and desire to secure by Letters Patent is:

1. An infrared radiation detection system having a pyroelectric radiation detector electrode structure for improving the responsivity of the system comprising:
   (a) a pyroelectric radiation detector having upper and lower electrodes which are mounted on the separated by a single layer of pyroelectric material,
   (b) means for applying infrared radiation from a field of view onto the upper electrodes of said pyroelectric radiation detector,
   (c) the upper and lower electrodes of said pyroelectric detector comprising a plurality of separated sections which are positioned with respect to each other on said layer of pyroelectric material to form a plurality of serially connected capacitive elements,
   (d) amplifier means having an input and an output, and
   (e) means for coupling said plurality of serially connected capactive elements of said pyroelectric radiation detector to the input of said amplifier.

2. The infrared radiation detection system set forth in claim 1 wherein the upper and lower elements have at least two electrodes which form a part of a single capacitive element with each of the remaining electrodes forming an electrode of two capacitive elements with the means for coupling said plurality of serially connected capacitive elements to the input of said amplifier connected to said two electrodes.

3. The infrared radiation detection system set forth in claim 2 wherein the sections of said upper and lower electrodes are arcuate sectors with at least one lower sector displaced with respect to at least one upper sector by half the angle of one electrode sector.

References Cited

UNITED STATES PATENTS

| | | | |
|---|---|---|---|
| 2,735,934 | 2/1956 | Keizer et al. | 317—248 X |
| 2,985,759 | 5/1961 | Goldsmith. | |
| 3,076,949 | 2/1963 | Anderson | 338—18 |
| 3,112,399 | 11/1963 | Chew. | |
| 3,273,033 | 9/1966 | Rossmeisl | 317—258 |

RALPH G. NILSON, Primary Examiner

M. J. FROME, Assistant Examiner

U.S. Cl. X.R.

73—355; 250—83; 317—247